US008980804B2

(12) United States Patent
Loper et al.

(10) Patent No.: US 8,980,804 B2
(45) Date of Patent: Mar. 17, 2015

(54) ALKYL ACRYLATE COPOLYMER DISPERSANTS AND USES THEREOF

(75) Inventors: John T. Loper, Richmond, VA (US); Naresh C. Mathur, Midlothian, VA (US); Sanjay Srinivasan, Midlothian, VA (US)

(73) Assignee: Afton Chemical Corporation, Richmond, VA (US)

( * ) Notice: Subject to any disclaimer, the term of this patent is extended or adjusted under 35 U.S.C. 154(b) by 919 days.

(21) Appl. No.: 11/494,598

(22) Filed: Jul. 28, 2006

(65) Prior Publication Data
US 2008/0027181 A1    Jan. 31, 2008

(51) Int. Cl.
*C10M 169/00* (2006.01)
*C08F 220/18* (2006.01)
*C10M 149/06* (2006.01)
*C10M 149/14* (2006.01)
*C08F 222/06* (2006.01)

(52) U.S. Cl.
CPC .............. *C08F 220/18* (2013.01); *C08F 222/06* (2013.01); *C08F 2220/1825* (2013.01); *C08F 2220/1891* (2013.01); *C10M 149/06* (2013.01); *C10M 149/14* (2013.01); *C10M 2209/084* (2013.01); *C10M 2215/04* (2013.01); *C10M 2215/221* (2013.01); *C10M 2215/28* (2013.01); *C10M 2217/046* (2013.01); *C10N 2220/021* (2013.01); *C10N 2230/02* (2013.01); *C10N 2230/04* (2013.01); *C10N 2230/06* (2013.01); *C10N 2230/10* (2013.01); *C10N 2240/04* (2013.01); *C10N 2260/09* (2013.01); *C08F 2800/20* (2013.01)
USPC ...................................................... 508/136

(58) Field of Classification Search
USPC ................. 508/287, 235, 136, 467, 469, 339; 525/551, 327.6, 382
See application file for complete search history.

(56) References Cited

U.S. PATENT DOCUMENTS

| 2,451,895 | A |  | 10/1948 | White |
|---|---|---|---|---|
| 2,577,706 | A |  | 12/1951 | Hotten |
| 3,576,743 | A |  | 4/1971 | Widmer et al. |
| 3,728,261 | A |  | 4/1973 | Mitacek |
| 4,359,325 | A |  | 11/1982 | Dawans et al. |
| 4,440,659 | A |  | 4/1984 | Chen et al. |
| 4,482,464 | A |  | 11/1984 | Karol et al. |
| 4,636,322 | A |  | 1/1987 | Nalesnik |
| 4,668,412 | A |  | 5/1987 | Hart et al. |
| 4,699,724 | A |  | 10/1987 | Nalesnik et al. |
| 4,767,553 | A |  | 8/1988 | Hart et al. |
| 4,941,985 | A |  | 7/1990 | Benfaremo et al. |
| 5,043,087 | A |  | 8/1991 | Pennewiss et al. |
| 5,055,213 | A |  | 10/1991 | Germanaud et al. |
| 5,178,641 | A |  | 1/1993 | Konrad et al. |
| 5,328,624 | A |  | 7/1994 | Chung |
| 5,332,867 | A | * | 7/1994 | Shaffer et al. .................. 174/151 |
| 5,368,761 | A |  | 11/1994 | Gore et al. |
| 5,409,623 | A |  | 4/1995 | Mishra et al. |
| 5,498,809 | A |  | 3/1996 | Emert et al. |
| 5,523,417 | A |  | 6/1996 | Blackborow et al. |
| 5,703,023 | A |  | 12/1997 | Srinivasan |
| 5,837,773 | A |  | 11/1998 | Olivier et al. |
| 5,849,676 | A |  | 12/1998 | Harrison et al. |
| 5,871,590 | A |  | 2/1999 | Hei et al. |
| 5,955,405 | A |  | 9/1999 | Liesen et al. |
| 6,025,308 | A | * | 2/2000 | Matsuya et al. .............. 508/235 |
| 6,107,257 | A |  | 8/2000 | Valcho et al. |
| 6,117,825 | A | * | 9/2000 | Liu et al. ........................ 508/291 |
| 6,255,261 | B1 |  | 7/2001 | Liesen et al. |
| 6,323,164 | B1 |  | 11/2001 | Liesen et al. |
| 6,358,892 | B1 |  | 3/2002 | Harrison et al. |
| 6,706,672 | B2 | * | 3/2004 | Kelley ........................... 508/287 |
| 6,869,919 | B2 |  | 3/2005 | Ritchie et al. |
| 6,974,535 | B2 |  | 12/2005 | Cody et al. |
| 7,378,379 | B2 |  | 5/2008 | Sivik et al. |

(Continued)

FOREIGN PATENT DOCUMENTS

| EP | 0 171 189 | A2 |  | 2/1986 |
|---|---|---|---|---|
| EP | 0 274 589-81 |  |  | 7/1988 |
| EP | 0853115 | A1 |  | 7/1998 |
| EP | 1086964 | A2 |  | 3/2001 |
| EP | 1 391 500 | A1 |  | 2/2004 |
| EP | 1721916 | A1 |  | 11/2006 |
| FR | 1374542 |  | * | 10/1964 |
| FR | 1374542 | A |  | 10/1964 |
| FR | 2640272 | A1 |  | 6/1990 |
| JP | 56092904 | A |  | 7/1981 |

(Continued)

OTHER PUBLICATIONS

India Patent Application No. 1427/CHE/2007, Examination Report dated Jan. 21, 2010.

(Continued)

*Primary Examiner* — Monique Peets
(74) *Attorney, Agent, or Firm* — Wolf, Greenfield & Sacks, P.C.

(57) ABSTRACT

A novel a polymer dispersant comprising an additive reaction product obtained by reacting a first monomer comprising a mixture of alkylacrylates of varying chain lengths with a second monomer comprising an olefinic carboxylic acylating agent under conditions effective for free radical polymerization of the first and second monomers to provide a base polymer comprising an acylated alkylacrylate copolymer, and wherein the base polymer is further reacted with a hydrocarbyl amine to provide an amine-functionalized polyalkylacrylate copolymer dispersant. The base polymer intermediate has a number average molecular weight between about 5,000 to about 50,000. The polyalkylacrylate copolymer dispersant has good dispersancy, low temperature properties, thickening efficiency, and antioxidancy properties. They also can improve fuel economy when used in engine lubricating compositions. They also are precipitation- or sedimentation-resistant, and do not cause or encourage such formations in finished fluids incorporating them.

18 Claims, 1 Drawing Sheet

(56) References Cited

U.S. PATENT DOCUMENTS

| | | |
|---|---|---|
| 7,696,138 B2 | 4/2010 | Mathur et al. |
| 2005/0202980 A1 | 9/2005 | Loper et al. |
| 2006/0025316 A1 | 2/2006 | Covitch et al. |
| 2008/0026964 A1 | 1/2008 | Srinivasan et al. |
| 2008/0026972 A1 | 1/2008 | Mathur et al. |
| 2008/0027181 A1 | 1/2008 | Loper et al. |
| 2008/0033114 A1 | 2/2008 | Srinivasan et al. |
| 2008/0051520 A1 | 2/2008 | Srinivasan et al. |

FOREIGN PATENT DOCUMENTS

| | | | | |
|---|---|---|---|---|
| JP | 7316579 A | | 12/1995 | |
| JP | 10298576 A | | 11/1998 | |
| JP | 2001164280 A | | 6/2001 | |
| JP | 2003-253285 | * | 2/2002 | ........... C10M 145/14 |
| JP | 2003-253285 | * | 9/2003 | ........... C10M 145/14 |
| JP | 2003253285 A | | 9/2003 | |
| JP | 2007186942 A | | 7/2007 | |
| WO | 9717417 A1 | | 5/1997 | |
| WO | 2004111163 A1 | | 12/2004 | |
| WO | WO2004111163 | * | 12/2004 | |

OTHER PUBLICATIONS

India Patent Application No. 1427/CHE/2007, First Examination Report.

Office Communication dated Sep. 29, 2008 for German Application No. 10 2007 031 516.5-43.

Office Communication dated Jun. 17, 2011 for German Application No. 10 2007 031 516.5-43.

Office Communication dated Nov. 15, 2012 for German Application No. 10 2007 031 516.5-43.

Office Communication dated Jan. 30, 2014 for German Application No. 10 2007 031 516.5-43.

Office Communication dated Dec. 17, 2010 for French Application No. FR0756761.

Office Communication dated Apr. 29, 2010 for Great Britain Application No. GB0713634.4.

Office Communication mailed Nov. 16, 2010 for Japanese Application No. 2007-186942.

Office Communication mailed Sep. 17, 2013 for Japanese Application No. 2011-271057.

* cited by examiner

Base Polymer Rxn.:
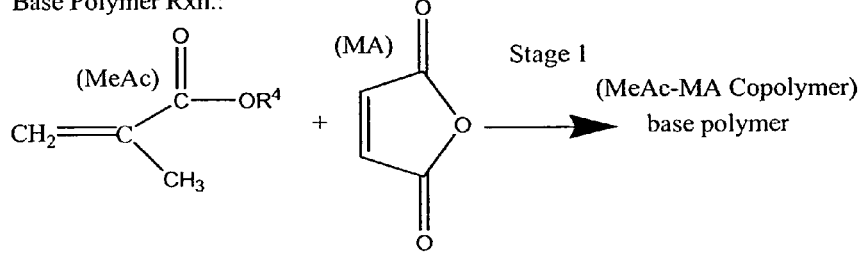
Product Rxn. Route 1:
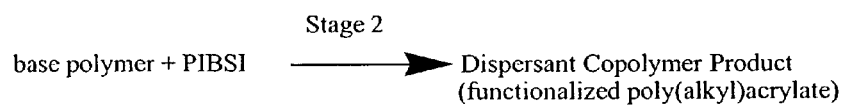
Product Rxn. Route 2:
Product Rxn. Route 3:
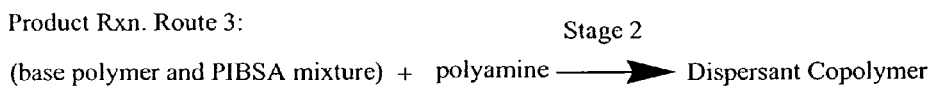
Product Rxn. Route 4:
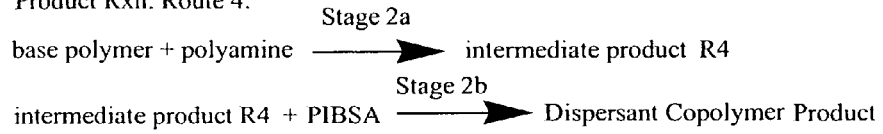

ALKYL ACRYLATE COPOLYMER DISPERSANTS AND USES THEREOF

TECHNICAL FIELD

This invention relates to a lubricant additive useful as an improved dispersant when employed in a lubricating oil composition.

BACKGROUND OF THE INVENTION

Dispersant additives are used to suspend oil-insoluble resinous oxidation products and particulate contaminants in the bulk oil. Ideally, this minimizes sludge formation, particulate-related wear, viscosity increase, and oxidation-related deposit formation. Dispersants are primarily used in gasoline engine and heavy-duty diesel engine oils. They are also used in natural gas engine oils, aviation piston engine oils, automatic transmission fluids and some types of gear lubricants. A variety of commercial dispersant additives have been available and used. For instance, N-substituted long-chain alkenyl succinimides have been used as ashless dispersants. An alkenylsuccinic acid intermediate is obtained by condensing an olefin polymer, such as polyisobutylene, with maleic anhydride. A basic part of the dispersant additive has then been obtained, e.g., from reacting the intermediate with amine compounds such as polyamines. Other previously used dispersants include high molecular weight esters, e.g., a reaction product of an alkylene glycol and a substituted succinic anhydride. Other known dispersants include Mannich bases obtained from high molecular weight alkylated phenols, such as, e.g., the reaction product of a polyalkylenephenol, polyalkylenepolyamine, and an aldehyde. Oil chemists are continually searching for dispersants that achieve optimum dispersancy and low-temperature performance at low concentrations. The present invention addresses the need for improved dispersants for lubricating oils and fluids.

SUMMARY OF THE INVENTION

The present invention is directed to novel dispersant compounds prepared by reacting a copolymer of maleic anhydride and a mixture of methacrylate monomers with a hydrocarbyl amine compound.

In one embodiment, novel polyalkylacrylate copolymer dispersants are additive reaction products obtained by:
reacting (i) a first set of monomers comprising alkyl acrylates comprising three different subgroups including a first subgroup of alkyl acrylates wherein the alkyl group has 1 to 4 carbon atoms, a second subgroup thereof wherein the alkyl group has 8 to 16 carbon atoms, and a third subgroup wherein the alkyl group has 17 to 30 carbon atoms, with (ii) a second monomer comprising an olefinic carboxylic acylating agent under conditions effective for free radical polymerization of the first and second monomers to provide a base polymer comprising an acylated alkyl acrylate copolymer having a weight average molecular weight between about 5,000 and about 50,000, and
reacting the base polymer with hydrocarbyl amine to provide a functionalized polyalkylacrylate copolymer dispersant. The reaction of the base polymer with the hydrocarbyl amine may be conducted as a single-stage or multi-stage reaction, as described herein.

Among other advantages, the base polymer and the functionalized polyalkylacrylate copolymer viscosity modifiers made according to the present invention have good dispersancy, thickening efficiency, low temperature properties, and/or antioxidancy properties. The dispersant products have improved low temperature properties and are useful in crankcase formulation packages, amongst other applications. Some necessary components within traditional lubricating oil, such as friction modifiers and grade of base oil, have generally tended to improve a formulation's low temperature properties. However, other components such as certain polymers, such as polyisobutylene-based dispersants, have been observed to negatively impact an oil formulation's low temperature properties. Although the use of a higher grade of base oil (e.g., Group II+ or Group III) in a formulation can improve an oil's fuel economy, these higher grades of base oil require more complex refinery processing, and thus add more cost to the resulting oil formulation. It has been discovered that the dispersant additives having improved low temperature properties according to embodiments of this invention can reduce or eliminate the need to use these expensive base oils.

The additive dispersants of the present invention also may be used in engine oil applications to improve or boost dispersancy, oxidation, high temperature high shear (HTHS)/fuel economy, and low temperature viscometrics (e.g., cold cranking simulator (CCS) and mini-rotary viscometer (MRV) properties) in conjunction with conventional succinimides and at a lower olefin copolymer (OCP) loading in the finished oil. Particularly, they exhibit outstanding low temperature properties in lubricating oils for applications such as crankcase lubricants and automatic transmission fluids. They exhibit excellent low temperature performance in a wide variety of base oils. Also, improved fuel economy, such as measured via Sequence VIB engine testing, is obtained with oils containing the dispersant additives embodied herein. They also are precipitation- or sedimentation-resistant, and do not cause or encourage such formations in finished fluids incorporating them. They additionally are polymer bound antioxidants having potential in enhancing the oxidative stability and dispersancy of lubricants which are limited by the thermal and oxidative stability of conventional lower molecular weight antioxidants.

As a reactant in the copolymerization reaction used for synthesizing the base polymer, the first set of monomers comprises three subgroups of alkyl(alkyl)acrylate monomers having general structure:

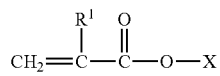

wherein $R^1$ may be hydrogen or alkyl, and X represents a non-substituted or substituted n-alkyl group with the proviso that the alkyl acrylate monomer reactant includes a first subgroup of alkyl(alkyl)acrylates where X is an alkyl group having 1 to 7 carbon atoms and preferably 1 to 4 carbon atoms (i.e., the "short" chain length group), a second subgroup where X has 8 to 16 carbon atoms (i.e., the "medium" chain length group), and a third subgroup where X has 17 to 30 carbon atoms (i.e., the "long" chain length group). The gravimetric ratio of the three subgroups, i.e., short/medium/long, of alkyl acrylate monomers used in the copolymerization reaction may range from about 5:95:0.05 to about 35:55:10, respectively. Substituted alkyl groups may include, e.g., an epoxy functional alkyl group, a keto functional alkyl group, or an aminoalkyl group.

In a particular embodiment, the first monomer comprises three subgroups of alkyl(alkyl)acrylates having general structure:

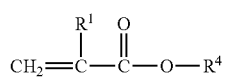

where $R^3$ is hydrogen or a C1-C5 alkyl group, and $R^4$ is a non-substituted or substituted C1-C30 alkyl group with the proviso that the alkyl acrylate monomer reactant includes three different subgroups comprising a first subgroup of alkyl (alkyl)acrylates in which $R^4$ has 1 to 4 carbon atoms, a second subgroup thereof in which $R^4$ has 8 to 16 carbon atoms and a third subgroup thereof in which $R^4$ has 17 to 30 carbon atoms. For purposes herein, the term "alkyl(alkyl)acrylate" generally refers to esters of alkyl(alkyl)acrylic acids and/or the precursor acids per se, which may be further defined or qualified within a particular context herein.

The second monomer may comprise an unsaturated monocarboxylic acid anhydride, an unsaturated dicarboxylic acid anhydride, or corresponding acid thereof, which may be selected, for example, from the group consisting of maleic anhydride, itaconic anhydride, halomaleic anhydride, alkylmaleic anhydride, maleic acid, and fumaric acid, and combinations and derivatives thereof. Suitable second monomers particularly may include unsaturated dicarboxylic acid anhydrides and their corresponding acids, more particularly those having the general formula A1, B1, C1 or D1:

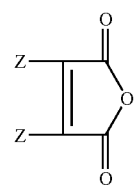 A1

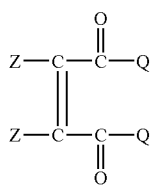 B1

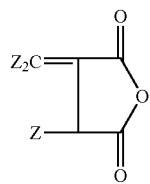 C1

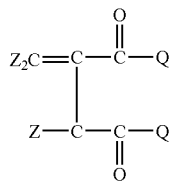 D1 wherein Z is preferably hydrogen but may also be an organic group such as a branched or straight chain alkyl group, an anhydride, a ketone group, a heterocyclic group or other organic group containing 1-12 carbon atoms. In addition, Z can be a halogen such as chlorine, bromine or iodine. Q can be OH or an alkoxy group containing 1-8 carbon atoms. Maleic anhydride and itaconic anhydride, and/or their corresponding acids, are particularly suitable. The base polymer may comprise monomeric units derived from about 99.9 to about 80 weight percent of alkyl acrylate monomers and about 0.1 to about 20 weight percent olefinic acylating agent monomers.

The hydrocarbyl amines have at least one primary nitrogen atom. Examples of hydrocarbyl amines include but are not limited to, polyalkenyl succinimides such as mono- and bis-polyisobutyl succinimide, acylated polyalkenyl succinimides such as acylated mono- and bis-polyisobutenyl succinimide, alkyl polyamines such as polyalkylene polyamines, polyisobutyl amines, fatty polyamines, and fatty alkyl ether polyamines. The fatty alkyl ether polyamines may be, for example, $C_{10-20}$ alkyloxyalkyl polyamines. The polyalkylene polyamines may be selected from, e.g., diethylenetriamine (DETA), triethylenetetramine (TETA), tetraethylenepentamine (TEPA), pentaethylenehexamine (PEHA), and bis-aminopropyl piperazine. Mono polyisobutenyl succinimide ("PIBSI") is one particular hydrocarbyl amine that may be used. A mono polyisobutenyl succinimide (PIBSI) can be prepared, e.g., by reaction of a polyalkylene polyamine with approximately one equivalent of poly(iso)butenyl succinic anhydride (PIBSA). The hydrocarbyl amine reactant also may comprise an acylated polyisobutylene succinimide ("PIBSAD") represented by the formula:

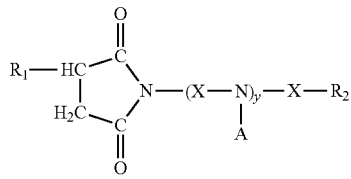

in which $R_1$ is a hydrocarbyl radical having from about 8 to 800 carbon atoms, X is a divalent alkylene or secondary hydroxy substituted alkylene radical having from 2 to 3 carbon atoms, A is $R_1$, hydrogen, or a hydroxyacyl radical, y is a number from 1 to 6, and $R_2$ is a radical selected from the group consisting of —$NH_2$, —NHA or a hydrocarbyl substituted succinyl radical having the formula:

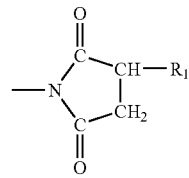

in which $R_1$ is as defined above.

The polyalkylacrylate copolymer dispersants are additive reaction products that may be prepared via several different reaction pathways in accordance with embodiments of this invention. For instance, in one embodiment, a reaction product (e.g., PIBSI) formed from a separate reaction of poly(iso)alkenyl substituted succinic anhydride (e.g., PIBSA) and a polyamine (e.g., a polyalkylene polyamine) is further reacted with the base polymer to yield the dispersant copolymer product. In another embodiment, the base polymer is reacted with an alkyl ether polyamine, e.g, a $C_{12}$-$C_{20}$ or higher alkyl ether polyamine, to yield the dispersant copolymer product. In yet another embodiment, the base polymer and polyalkenyl substituted succinic anhydride (e.g., PIBSA) are commingled to form a physical mixture or blend thereof, which mixture is reacted with polyamine to yield the dispersant copolymer product. In another alternative, the base polymer is reacted with polyamine to form an intermediate, which is further reacted with polyalkenyl substituted succinic anhydride (e.g., PIBSA) to yield the dispersant copolymer product.

For dispersant applications, it is preferred that the base polymer has a number average molecular weight (Mn) between about 5,000 to about 50,000, more preferably about 8,000 to about 15,000, as determined by gel permeation chromatography. The base polymer may have a polydispersity index value of about 1.2 to about 2. The amine-functionalized polyalkylacrylate products may have a number average molecular weight between about 5,000 to about 120,000, particularly between about 5,000 and 50,000, and more particularly between about 5,000 to about 35,000.

In one non-limiting embodiment, the base polymer (I), and a functionalized polyalkylacrylate copolymer dispersant (IIa+IIb) having a number average molecular weight between about 5,000 to about 50,000 made with the base polymer, have the following respective structures:

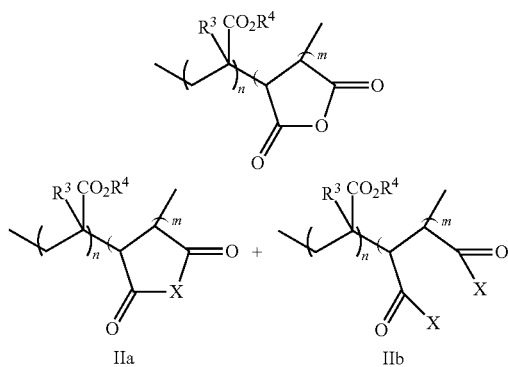

where for structures I, IIa, and IIb, m is defined as ranging from 0.1% to 20% of the value of n, wherein the sum of m and n is between 5,000 and about 50,000, X represents a moiety derived from the functionalizing amine bonded to the molecule through the nitrogen of an amine group, $R^3$ and $R^4$ represent the same groups as defined hereinabove. In a particular embodiment, X is derived from a functionalizing amine having the structure: R'R"(NR)$_a$NR'"R"", wherein R, R', R", R'", R"" are independently H, alkyl, alkaryl, aralkyl, cycloalkyl, or aryl hydrocarbon and R is alkylene, aralkylene, cycloalkylene, alkarylene, or arylene, and a is 0-20. The dispersant product typically is obtained as a physical combination of compounds of structures IIa and IIb.

Novel lubricant compositions of the present invention also are provided comprising an oil of lubricating viscosity and an effective amount of the functionalized polyalkylacrylate copolymer reaction product (i.e., the additive reaction product), in the form of additive concentrates or finished lubricants. The lubricating fluid compositions may include, e.g., crankcase oils, gear oils, EO, ATFs, and industrial/AW hydraulic fluids. These lubricant compositions can be used to lubricate internal combustion engines, engine transmissions, gears and other mechanical devices and components. The additive reaction products of the present invention can effectively extend the service time available between oil drains in a vehicle having an engine lubricated with a lubrication composition containing the additive reaction products, among other benefits and advantages. The invention is also directed to engines lubricated with these improved lubricating compositions and compounds.

It is to be understood that both the foregoing general description and the following detailed description and FIGURE referenced therein are exemplary and explanatory only and are intended to provide further explanation of the present invention, as claimed.

BRIEF DESCRIPTION OF DRAWING

The sole FIGURE shows reaction scheme for preparing a base polymer intermediate and several alternative reaction routes for preparing amine-functionalized copolymer products using the base polymer in accordance with a non-limiting illustration of the present invention.

DETAILED DESCRIPTION OF THE PREFERRED EMBODIMENTS

A novel functionalized polyalkylacrylate copolymer is the reaction product of a method comprising copolymerizing a set of alkyl acrylate monomers comprised of three subgroups of alkyl acrylates having respective short, medium and long alkyl chain lengths as prescribed herein with an olefinic carboxylic acid acylating agent in the presence of a free radical initiator to provide a base polymer comprising an acylated alkylacrylate copolymer, which is further reacted with a hydrocarbyl amine compound to provide a multi-functional polyalkylacrylate copolymer dispersant. The base polymer per se also represents a novel compound useful as a lubricant additive.

The functionalized polyalkylacrylate copolymer product or base polymer can be diluted in an oil of lubricating viscosity to provide a lubricant. It may be beneficially used directly, or alternatively as pre-diluted in base oil in concentrate form, as an additive for lubricants. It may be used in lubrication compositions for one or more functions including as a dispersant, antioxidant, film formation improver, deposit controller, as well as other functions. It is particularly useful as a dispersant.

1. Preparation of Base Polymer

First Set of Monomers

Referring to the sole FIGURE, an exemplary reaction scheme is illustrated for preparing base polymer and functionalized copolymer products in accordance with a non-limiting example of the present invention. As illustrated therein, in an initial stage of processing ("Stage 1") of the reaction scheme, methacrylate (MeAc) and maleic anhydride (MA) are copolymerized to form a polymethacrylate-maleic anhydride copolymer (MeAc-MA Copolymer). It will be appreciated from the following descriptions that the invention has broader application than the exemplary illustration of the FIGURE. The base polymer is a stable compound, which may be stored and handled before being further functionalized. Also, it does not necessarily need to be further functionalized to be ready-for-use itself as a beneficial lubricant additive, depending on the particular application.

More generally, as a reactant in the copolymerization reaction used for synthesizing the base polymer (e.g., Stage 1), a first set of monomers may comprise acrylates or their acids having general structure 1a:

wherein $R^1$ may be hydrogen or alkyl, and X represents alkyl, or Y, where Y has general structure 1:

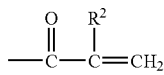

where $R^2$ may be hydrogen or alkyl. In a particular embodiment, general structure 1a represents an alkyl(alkyl)acrylate in which X represents a non-substituted or substituted n-alkyl group with the proviso that the alkyl acrylate monomer reactant include a first subgroup of alkyl(alkyl)acrylates having 1 to 7 carbon atoms and preferably 1 to 4 carbon atoms in the terminal alkyl group X (i.e., the "short" chain length group), a second subgroup thereof having 8 to 16 carbon atoms in alkyl group X (i.e., the "medium" chain length group), and a third subgroup thereof having 17 to 30 carbon atoms in alkyl group X (i.e., the "long" chain length group). The gravimetric ratio (i.e., a wt:wt:wt percentage basis) of the three subgroups, i.e., short/medium/long, of alkyl acrylate monomers ("AAM's") used in the copolymerization reaction may range from about 5:95:0.05 to about 35:55:10, respectively,. That is, generally about 5 to about 35 wt % short chain AAMs, about 95 to about 55 medium chain AAM's, and about 0.05 to about 10 wt % long chain AAM's may be used as the reactant monomers in the copolymerization reaction.

Substituted alkyl groups may include, e.g., an epoxy functional alkyl group, a keto functional alkyl group, or an aminoalkyl group.

In an alternative embodiment, general structure 1a represents an acrylate in which X represents Y having general structure 1 as defined above.

In a particular embodiment, such as exemplified in the sole FIGURE, the first monomer comprises three subgroups of alkyl(alkyl)acrylates having general structure 2a:

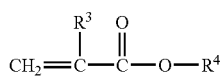

where $R^3$ is hydrogen or a C1-C5 alkyl group, and $R^4$ is a non-substituted or substituted C1-C30 alkyl group with the proviso that the alkyl (alkyl) acrylate monomer reactant includes three different subgroups comprising a first subgroup of alkyl(alkyl)acrylates in which $R^4$ is an alkyl group having 1 to 4 carbon atoms, a second subgroup in which $R^4$ is an alkyl group having 8 to 16 carbon atoms, and a third subgroup in which $R^4$ is an alkyl group having 17 to 30 carbon atoms.

As indicated, the term "alkyl(alkyl)acrylate", as used herein, generally refers to esters of alkyl(alkyl)acrylic acids and/or the precursor acids themselves, such as those having structure (1a), which may or may not be further defined or qualified within a particular context herein. In one embodiment, the alkyl(alkyl)acrylate may comprise C1-C30 alkyl (meth)acrylate, where the "C1-C30 alkyl" portion of the named compound corresponds to $R^4$ in above general structure 2a. This alkyl(meth)acrylate is an alkyl ester of acrylic or methacrylic acid having a straight or branched alkyl group of 1 to 30 carbon atoms per group. In this regard, and with reference to structure 2a, the terminology "alkyl(alkyl)acrylate" occasionally may be applied herein for sake of convenience to more specifically identify the $R^4$ group (corresponding to the first-mentioned alkyl group) as well as the $R^3$ group (corresponding to the second-mentioned alkyl group) portions of the named acrylate compound.

Non-limiting examples of the first monomer include, e.g., methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, nonyl (meth)acrylate, decyl (meth)acrylate, undecyl (meth)acrylate, lauryl (meth)acrylate, myristyl (meth)acrylate, dodecyl pentadecyl methacrylate, stearyl (meth)acrylate, cetyl (meth)acrylate, heptadecyl(meth)acrylate, nonadecyl (meth) acrylate, eicosyl (meth) acrylate, heneicosyl methacrylate, docosyl methacrylate, glycidyl (meth)acrylate, and aminopropyl(meth)acrylate, and blends, mixtures and combinations thereof. The first monomer also may have structure 2:

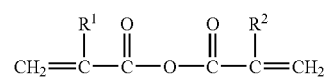

where $R^1$ and $R^2$ have the same meanings as described above.

The alkyl (meth)acrylate monomers generally may be prepared by standard esterification procedures using technical grades of aliphatic alcohols. Individual alkyl (meth) acrylates or mixtures thereof may be used. Those skilled in the art will appreciate that minor levels of other monomers, polymerizable with the alkyl(meth)acrylates disclosed herein, may be present as long as they do not adversely affect the dispersancy and low temperature properties of the fully formulated fluids, for example, increasing the low temperature pumping viscosity of a lubricating fluid when dispersant is used in combination with a VI improver, etc. Typically additional monomers are present in an amount of less than about 5 weight percent, preferably in an amount of less than 3 weight percent, most preferably in an amount of less than 1 weight percent. For example, the addition of minor levels of monomers such as nitrogen-containing alkyl(meth) acrylates, hydroxy- or alkoxy-containing alkyl(meth)acrylates, ethylene, propylene, styrene, vinyl acetate and the like are contemplated within the scope of this invention as long as the presence of these monomers do not materially increase the polarity of the copolymers.

Second Set of Monomers

As shown in the sole FIGURE, the alkylacrylate monomers are reacted with a second set of monomers, illustrated therein in a non-limiting manner as maleic anhydride (MA). The second set of monomers generally may include an unsaturated monocarboxylic acid anhydride, an unsaturated dicarboxylic acid anhydride, or corresponding acid thereof. Suitable second monomers particularly may include unsaturated dicarboxylic acid anhydrides and their corresponding acids, more particularly those having the general formula A1, B1, C1 or D1:

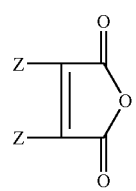

-continued

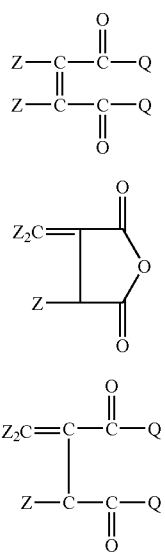

B1

C1

D1 wherein Z is preferably hydrogen but may also be an organic group such as a branched or straight chain alkyl group, an anhydride, a ketone group, a heterocyclic group or other organic group containing 1-12 carbon atoms. In addition, Z can be a halogen such as chlorine, bromine or iodine. Q can be OH or an alkoxy group containing 1-8 carbon atoms.

Suitable second set monomers may be selected, for example, from the group consisting of maleic anhydride, itaconic anhydride, halomaleic anhydride, alkylmaleic anhydride, maleic acid, and fumaric acid, and combinations and derivatives thereof. Examples of these monomers are set forth, for example, in U.S. Pat. No. 5,837,773, which descriptions are incorporated herein by reference. Maleic anhydride or a derivative thereof is generally most preferred due to its commercial availability and ease of reaction. In the case of unsaturated ethylene copolymers or terpolymers, itaconic acid or its anhydride is preferred due to its reduced tendency to form a cross-linked structure during the free-radical copolymerization process. The ethylenically unsaturated carboxylic acid materials typically can provide one or two carboxylic groups per mole of reactant to the polymer.

Free-Radical Initiator

The reaction to form the base polymer, i.e., the acylated acrylate intermediates, in "Stage 1" shown in the sole FIGURE, is generally carried out with the aid of a free-radical initiator. The free-radical initiators which may be used include, for example, peroxides, hydroperoxides, peresters, and also azo compounds and preferably those which have a boiling point greater than 100° C. and decompose thermally within the polymerization reaction temperature range to provide free radicals. Representatives of these free-radical initiators are benzoyl peroxide, 1-butyl perbenzoate, t-butyl peroctoate, cumen hydroperoxide, azoisobutyronitrile, 2,2'-azosbis (2-methylbutanenitrile), 2,5-dimethylhexane-2,5-bis-tertiarybutyl peroxide, and 2,5-dimethylhex-3-yne-2,5-bis-tertiary-butyl peroxide, etc. The initiator is used in an amount of between about 0.005% and about 1% by weight based on the weight of the reaction mixture.

Suitable chain transfer agents may also be included, e.g., mercaptans (thiols) such as lauryl mercaptan, dodecyl mercaptan, ethyl mercaptan, etc. The selection of the amount of chain transfer agent to be used is based on the desired molecular weight of the polymer being synthesized as well as the desired level of shear stability for the polymer, i.e., if a more shear stable polymer is desired, more chain transfer agent can be added to the reaction mixture. Particularly, the chain transfer agent is added to the reaction mixture in an amount of 0.01 to 3 weight percent, more particularly 0.02 to 2.5 weight percent, relative to the monomer mixture.

The molecular weight of the base polymer product can be manipulated by adjusting the addition levels of the free-radical initiator and chain transfer agents. In general, all other variables equal, the use of increasing levels of free-radical initiator and chain transfer agents reduces the molecular weight of the resulting base polymer product, while decreasing levels thereof has the opposite effect on product's molecular weight.

Copolymerization Reaction Equipment and Conditions

In order to prepare the base polymer (i.e., the acylated alkylacrylate copolymer intermediates) of the present invention, polymerization of the alkylacrylate monomers and an olefinic carboxylic acid acylating agent can take place under a variety of conditions, including bulk polymerization, solution polymerization, usually in an organic solvent, preferably mineral oil, emulsion polymerization, suspension polymerization and non-aqueous dispersion techniques. This reaction can be conducted either in a batch or continuous operation. It can be performed neat or in solution in a continuous flow or batch reactor equipped with intensive mixing capability. It also can be performed in an extruder or similar continuous intensive mixing device. Solution polymerization is preferred. In the solution polymerization, a reaction mixture comprising a diluent, the alkylacrylate monomer, the olefinic carboxylic acid acylating agent monomer, and a polymerization initiator is prepared.

The diluent may be any inert hydrocarbon and is preferably hydrocarbon lubricating oil that is compatible with or identical to the lubricating oil in which the copolymer is to be subsequently used. The reaction mixture may includes, e.g., from about 15 to about 400 parts by weight (pbw) diluent per 100 pbw total monomers and, more preferably, from about 50 to about 200 pbw diluent per 100 pbw total monomers. As used herein, "total monomer charge" means the combined amount of all monomers in the initial, i.e., unreacted reaction mixture.

In preparing the copolymer intermediates of the present invention by free-radical polymerization the monomers may be polymerized simultaneously or sequentially, in any order. The base polymer may comprise monomeric units derived from about 99.9 to about 80 weight percent of alkylacrylate monomers and about 0.1 to about 20 weight percent olefinic acylating agent monomers. In a particular embodiment, the total monomer charge includes from 80 to 99.9 weight percent, preferably 90 to 99 weight percent, C1-C30 alkyl (meth) acrylate; and 0.1 to 20 weight percent, preferably 1 to 10 weight percent, maleic anhydride. Suitable polymerization initiators include initiators which disassociate upon heating to yield a free radical, e.g., peroxide compounds such as benzoyl peroxide, t-butyl perbenzoate, t-butyl peroctoate and cumene hydroperoxide; and azo compounds such as azoisobutyronitrile and 2,2'-azobis (2-methylbutanenitrile). The mixture includes from about 0.01 wt % to about 1.0 wt % initiator relative to the total monomer mixture. The copolymer synthesis reaction is conducted in oil suitable for providing a polymerization medium, such as mineral or other base oil.

By way of example and without limitation, the reaction mixture may be charged to a reaction vessel that is equipped with a stirrer, a thermometer and a reflux condenser and heated with stirring under a nitrogen blanket to a temperature from about 70° C. to about 160° C. for a period of about 0.5 hours to about 6 hours to carry out the polymerization reaction. In a further embodiment, a portion, e.g., about 25 to 60% of the reaction mixture is initially charged to the reaction vessel and heated. The remaining portion of the reaction mixture is then metered into the reaction vessel, with stirring and while maintaining the temperature or the batch within the above describe range, over a period of about 0.5 hours to about 3 hours. A viscous solution of the copolymer of the present invention in the diluent is obtained as the product of the above-described process.

The processing equipment is generally purged with nitrogen to prevent oxidation of the polymer and to aid in venting unreacted reagents and byproducts of the polymerization reaction. The residence time in the processing equipment is controlled to provide for the desired degree of acylation and to allow for purification of the base polymer product via venting. Mineral or synthetic lubricating oil may optionally be added to the processing equipment after the venting stage to dissolve the base polymer product.

For dispersant applicants, it is preferred that the base polymer prepared has a number average molecular weight between about 5,000 to about 50,000, particularly between about 8,000 and 15,000, as determined by gel permeation chromatography. The base polymer may have a polydispersity index value of about 1.2 to about 2.

Vacuum Stripping of Unreacted Ingredients

Upon completion of the copolymerization reaction ("Stage 1"), unreacted carboxylic reactant and free radical initiator may be optionally removed and separated from the base polymer before further functionalization is performed on the base polymer. The unreacted components may be eliminated from the reaction mass by vacuum stripping, e.g., the reaction mass may be heated to temperature up to about 250° C. under agitation with a vacuum applied for a period sufficient to remove the volatile unreacted monomer and free radical initiator ingredients.

The base polymer (intermediate) is a stable compound, which may be stored and handled before being further functionalized. Also, it may not necessarily need to be further functionalized to be ready-for-use itself as a beneficial lubricant additive, depending on the particular application. In a preferred embodiment, the base polymer is further functionalized via amination reaction. The functionalized polyalkylacrylate copolymer dispersant is an enhanced form of the novel base polymer (i.e., the non-aminated copolymer).

Preparation of Dispersant Compound with Base Polymer

Referring again to the sole FIGURE, in the second stage of processing ("Stage 2"), the base polymer, which possesses carboxylic acid acylating functions, is reacted with a hydrocarbyl amine compound to form a polyalkylacrylate copolymer dispersant compound.

As indicated in the sole FIGURE, the polyalkylacrylate copolymer dispersant compounds are additive reaction products that may be prepared via several different reaction pathways in accordance with embodiments of this invention. For instance, in "Product Rxn. Route 1", at Stage 2 a reaction product (e.g., PIBSI) formed from a separate reaction of poly(iso)alkenyl substituted succinic anhydride (e.g., PIBSA) and a polyamine (e.g., a polyalkylene polyamine) is further reacted with the base polymer obtained at Stage 1 to yield the dispersant copolymer product. In the alternative having the heading "Product Rxn. Route 2", the base polymer is reacted with an alkyl ether polyamine to yield the dispersant copolymer product. In the alternative having the heading "Product Rxn. Route 3", the base polymer and polyalkenyl substituted succinic anhydride (e.g., PIBSA) are commingled to form a physical mixture or blend thereof, which mixture is reacted with polyamine to yield the dispersant copolymer product. In the alternative having the heading "Product Rxn. Route 4", the base polymer is reacted with polyamine to form an intermediate ("Stage 2a"), which is further reacted with polyalkenyl substituted succinic anhydride (e.g., PIBSA) to yield the dispersant copolymer product ("Stage 2b").

These hydrocarbyl amines have at least one primary nitrogen atom. The hydrocarbyl amine compound generally may be, for example, an aromatic amine, aliphatic amine, or a polyamine, or a combination thereof. Examples of hydrocarbyl amine compounds include, but are not limited to, polyalkenyl succinimides such as mono-polyisobutenyl succinimide (PIBSI), acylated polyalkenyl succinimides such as mono-polyisobutenyl succinimide (e.g., PIBSAD), alkyl polyamines (e.g., PIB amines), fatty polyamines, and fatty alkyl ether polyamines (e.g., $C_{10-20}$ or higher alkyloxyalkyl polyamines).

Mono polyalkenyl succinimides such as mono polyisobutenyl succinimide ("PIBSI") are one particular category of hydrocarbyl amines that may be used, especially for purposes of Product Rxn. Route 1 as illustrated in the sole FIGURE. A mono polyisobutenyl succinimide (PIBSI) can be prepared by reaction of a polyalkylene polyamine with approximately one equivalent of poly(iso)butenyl succinic anhydride (PIBSA). PIBSA may be prepared by the reaction of poly(iso)butene with maleic anhydride in known manners. In one embodiment, PIBSI comprises a reaction product that may be generally prepared by the following process which comprises reacting a polyethylene polyamine with an alkenyl succinic acid anhydride (PIBSA) to form a mono- and/or bis-alkenyl succinimide (PIBSI) wherein the ratio of PIBSA moiety to amine units in these reactants is in the range of 3:1 to 1:1, particularly 2:1 to 1:1, and most particularly is approximately 1:1. In a particular embodiment, a mono polyisobutenyl succinimide dispersant (PIBSI) that can be prepared by reaction of a polyamine with one equivalent of PIB-succinic anhydride (PIBSA). The reactant polyamine used for this reaction is suitably an amine which has at least two basic nitrogen atoms of which at least one is a primary amino group. A polyamine substituted with —OH groups or alkoxy groups or polyoxyalkylene groups can also be used in this reaction. Specific examples of the polyamines that may be used include, e.g., diethylenetriamine (DETA), triethylenetetramine (TETA), tetraethylenepentamine (TEPA), pentaethylenehexamine (PEHA), dipropylenetriamine (DPTA), bis(hexamethylene)triamine, 1,3,6-trisaminomethylcyclohexane (TMAH), trimethylhexamethylenediamine (TMD), polyetherpolyamines, diethylaminopropylamine (DEAPA), 1,4-bis(3-aminopropyl)piperazine, ethylene diamine, dimethylamino propylamine, N-hydroxyethyl ethylenediamine, polyether amines and the like.

In another particular embodiment, which may be applied to Product Rxn. Route 1 in particular, the hydrocarbyl amine compound reactant used for the amine functionalization of the base polymer may comprise an acylated polyisobutylene succinimide (PIBSAD) represented by the formula:

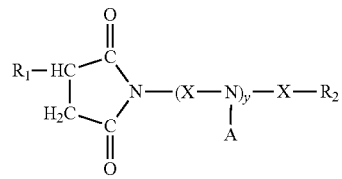

in which $R_1$ is a hydrocarbyl radical having from about 8 to 800 carbon atoms, X is a divalent alkylene or secondary hydroxy substituted alkylene radical having from 2 to 3 carbon atoms, A is $R_1$, hydrogen, or a hydroxyacyl radical, y is a number from 1 to 6, and $R_2$ is a radical selected from the group consisting of —$NH_2$, —NHA or a hydrocarbyl substituted succinyl radical having the formula

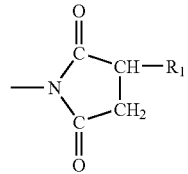

in which $R_1$ is as defined above. In one non-limiting embodiment, A may be a hydroxyacyl radical selected from the group consisting of glycol, lactyl, 2-hydroxy-methyl propionyl and 2,2'-bishydroxymethyl propionyl radicals and in which at least 30 percent of said radicals represented by A are said hydroxyacyl radicals. Alternatively, A may form a branched group, such as where A is $R_1$.

PIBSAD may be prepared, e.g., by reacting the mono- and/or bis-alkenyl succinimide (PIBSI) with an acylating compound, thereby forming an acylated mono- and/or bis-alkenyl succinimide; and recovering the acylated mono- and/or bis-alkenyl succinimide. In carrying out the process of making PIBSAD, the reagents are step wise reacted with a long chain hydrocarbyl substituted dicarboxylic acid anhydride containing residual unsaturation in a "one pot reaction". The long chain hydrocarbon group is a ($C_2$-$C_{10}$) polymer, e.g., a ($C_2$-$C_5$) monoolefin, the polymer having a number average molecular weight (Mn) of about 500 to about 10,000.

The preferred olefin polymers for reaction with the unsaturated dicarboxylic acid anhydride or ester are polymers comprising a major molar amount of ($C_2$-$C_{10}$) polymer, e.g., a ($C_2$-$C_5$) monoolefin. Such olefins include ethylene, propylene, butylene, isobutylene, pentene, 1-octene, styrene, etc. The polymers can be homopolymers such as polyisobutylene, as well as copolymers of two or more of such olefins such as copolymers of: ethylene and propylene, butylene and isobutylene, propylene and isobutylene, etc. Other copolymers include those in which a minor molar amount of the copolymer monomers e.g., 1 to 10 mole % is a ($C_4$-$C_{10}$) non-conjugated diolefin, e.g., a copolymer of isobutylene and butadiene; or a copolymer of ethylene, propylene and 1,4-hexadiene; etc.

The long chain hydrocarbyl substituted dicarboxylic acid producing material, e.g. acid or anhydride used in the invention includes a long chain hydrocarbon, generally a polyolefin, substituted typically with an average of at least about 0.8 per mole of polyolefin, of an alpha- or beta-unsaturated ($C_4$-$C_{10}$) dicarboxylic acid, anhydride or ester thereof, such as fumaric acid, itaconic acid, maleic acid, maleic anhydride, chloromaleic acid, dimethylfumarate, chloromaleic anhydride, and mixtures thereof.

The alkenyl succinic acid anhydride may be characterized by the following formula 3

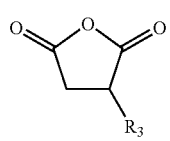

3 where $R_3$ may be a residue (containing residual unsaturation) from a polyolefin which was reacted with maleic acid anhydride to for the alkenyl succinic acid anhydride. $R_3$ may have a number average molecular weight (Mn) ranging from about 500 to about 10,000, preferably from about 1000 to about 5000, and more preferably from about 2000 to about 2500.

The polyamine compounds may be selected from aromatic polyamine compounds such as described, e.g., in U.S. Pat. Nos. 4,482,464 and 6,117,825, which descriptions are incorporated herein by reference.

The reaction between the base polymer and the prescribed hydrocarbyl amine compound is preferably conducted by heating a solution of the base polymer under inert conditions and then adding the amine compound to the heated solution generally with mixing to effect the reaction. It is convenient, although not required, to employ an oil solution of the base polymer heated to 70° C. to 160° C. while maintaining the solution under a nitrogen blanket. The polyamine compound is added to this solution, usually dropwise, or in portions if it is solid, and the reaction is effected under the noted conditions. The polyamine compound can be dissolved with any of a mineral oil, surfactant, solvent, or synthetic oil, and can be added to a mineral or synthetic lubricating oil or solvent solution containing the base polymer. This solution may be heated with agitation under an inert gas purge at a temperature in the range of 70° to 160° C. The reaction may be carried out conveniently in a stirred reactor under nitrogen purge. The reaction also may be carried neat, i.e. without using mineral oil or other medium. The reaction product can be further heated under vacuum to further isolate the product. In one preferred aspect, a base polymer in oil solution is reacted with PIBSI or PIBSAD in a reactor carried out between 70 and 160° C. under nitrogen for 3 hours.

Surfactants which optionally may be used in carrying out the reaction of the acylated polymer with the polyamine compound(s) include but are not limited to those characterized as having (a) solubility characteristics compatible with mineral or synthetic lubricating oil, (b) boiling point and vapor pressure characteristics so as not to alter the flash point of the oil and (c) polarity suitable for solubilizing the polyamine(s).

A suitable class of such surfactants includes the reaction products of aliphatic and aromatic hydroxy compounds with ethylene oxide, propylene oxide or mixtures thereof. Such surfactants are commonly known as aliphatic or phenolic alkoxylates. Representative examples are SURFONIC® L-24-2, NB40, N-60, L-24-5, L-46-7 (Huntsman Chemical Company), NEODOL® 23-5 and 25-7 (Shell Chemical Company) and TERGITOL® surfactants (Union Carbide). Preferred surfactants include those surfactants that contain a functional group, e.g., —OH, capable of reacting with the acylated polymer. Ethoxylated lauryl alcohol ($C_{12}H_{25}$(OCH$_2$CH$_2$)$_n$OH) is particularly preferred. Ethoxylated lauryl alcohol is identified under CAS no. 9002-92-0. The ethoxylated lauryl alcohol is a processing aid and viscosity stabilizer for the final multifunctional viscosity modifier product. The ethoxylated lauryl alcohol facilitates the amine charge into the reaction mixture. It is a reaction agent ensuring that no acylated functionality is left unreacted. Any unreacted acylated functionality causes undesirable viscosity drift in finished lubrication formulations. The surfactant also modifies the viscoelastic response in the multifunctional viscosity modifier product allowing improved handling at low temperature (70 to 90° C.).

The quantity of surfactant used depends in part on its ability to solubilize the polyamine compound. Typically, concentrations of 5 to 40 wt. % polyamine are employed. The surfactant can also be added separately, instead of or in addition to the concentrates discussed above, such that the total amount of surfactant in the finished additive is 10 wt. % or less.

In another embodiment, applicable to "Product Rxn. Route 2" in particular, the hydrocarbyl amine that is reacted with the base polymer is a fatty alkyl ether polyamine, e.g., a $C_{12}$-$C_{20}$ or higher alkyloxyalkyl polyamine and particularly $C_{12}$-$C_{20}$ alkyloxyalkyl diamines. Examples of such fatty alkyl ether polyamines include, e.g., tetradecyloxypropyl-1,3-diaminopropane); a $C_{12-14}$ alkyl oxypropyl-1,3-diaminopropane; a $C_{12-15}$ alkyloxypropyl amine and other similar materials that can be obtained in the market place from Tomah under the tradename of TOMAH® DA-17, and the like.

The amine-functionalized polyalkylacrylate product may have a number average molecular weight between about 50,000 to about 1,000,000.

Dispersant Product Structure

In one non-limiting embodiment, the base polymer (I), and the functionalized polyalkylacrylate copolymer dispersant (IIa+IIb) having a number average molecular weight between about 5,000 to about 50,000, have the following respective structures:

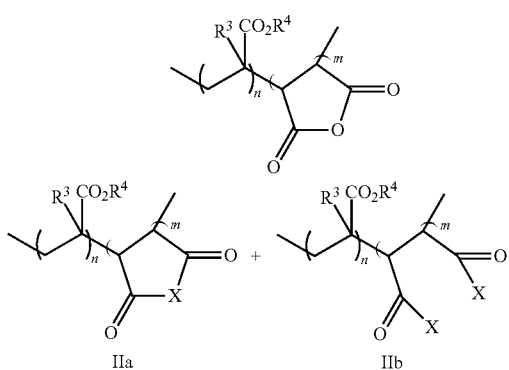

where for structures I, IIa, and IIb, m is defined as ranging from 0.1% to 20% of the value of n, wherein the sum of m and n is between 5,000 and about 50,000, X represents a moiety derived from the functionalizing amine bonded to the molecule through the nitrogen of an amine group, $R^3$ and $R^4$ represent the same groups as defined hereinabove. That is, $R^3$ is hydrogen or a C1-C5 alkyl group, and $R^4$ is a non-substituted or substituted C1-C30 alkyl group with the proviso that $R^4$ is selected effective to provide said first, second and third subgroups of alkyacrylate monomers in said molar ratio. In a particular embodiment, X in structures I, IIa and IIb is derived from a functionalizing amine having the structure: R'R"(NR)$_a$NR'"R"", wherein R, R', R", R'", R"" are independently H, alkyl, alkaryl, aralkyl, cycloalkyl, or aryl hydrocarbon and R is alkylene, aralkylene, cycloalkylene, alkarylene, or arylene, and a is 0-20. The dispersant product typically is obtained as a physical combination of compounds of structures IIa and IIb.

Color Stabilization

The acylated alkylacrylate polymer also may be color stabilized after the amination reaction, such as by reacting the acylated alkylacrylate polymer with a $C_7$ to $C_{12}$ alkyl aldehyde (e.g., nonyl aldehyde). For example, the reaction may proceed the alkyl aldehyde agent added in an amount of about 0.2 to about 0.6 wt. % under similar temperature and pressure conditions as used in the amination reaction for about 2 to about 6 hours.

Filtering

To increase the purity of the aminated, color stabilized acylated acrylated polymer product, it may be filtered, e.g., by either bag or cartridge filtration or both in series.

The functionalized polyalkylacrylate copolymer product compounds of the present invention optionally may be post-treated so as to impart additional properties necessary or desired for a specific lubricant application. Post-treatment techniques are well known in the art and include, e.g., boronation, phosphorylation, and maleination.

III. Lubricating Compositions

The base polymer or the multi-functional polyalkylacrylate copolymer products, or combinations thereof, of the present invention may be beneficially used directly, or alternatively as pre-diluted in base oil in concentrate form, as unique additives for lubricants. The base polymer and multi-functional polymer products of the present invention find utility in lubricating oil compositions which employ base oil in which the additives are dissolved or dispersed in amount sufficient to provide the desired functionality. Such base oils may be natural, synthetic or mixtures thereof. Base oils suitable for use include those described, for example, in U.S. Pat. Nos. 6,255,261 B1 and 6,107,257, which descriptions are incorporated herein by reference.

Base oils suitable for use in preparing the lubricating oil compositions of the present invention include those conventionally employed as crankcase lubricating oils for spark-ignited and compression-ignited internal combustion engines, such as automobile and truck engines, marine and railroad diesel engines, and the like. The internal combustion engines which can be advantageously lubricated with crankcase lubricating oils containing the unique dispersant additives set forth herein include gasoline, gasohol, and diesel fuel powered engines. The diesel engines that can be beneficially lubricated include, but are not limited to, heavy duty diesel engines, including those equipped with exhaust gas recirculation (EGR) systems.

Among other advantages, these additives have been observed in performance tests to have good dispersancy, low temperature properties, thickening efficiency, and antioxidancy properties.

Dispersant additives of the present invention also impart improved CCS low temperature engine properties and sludge dispersancy. From the observed study results, enhanced dispersancy and fuel economy improvement is expected to be achieved for most standard engine performance tests using the dispersant additives of the present invention. The cold crank simulator (CCS) test (ASTM D-5293) is a standard test used to determine a formulation's low temperature properties. This test determines the apparent viscosity of lubricants at low temperatures and high shear rates. The lower a lubricant's cold crank viscosity, the easier an engine will turn over in cold temperatures. 10W motor oils are tested at −25° C. and must have a viscosity below 7000 cP to pass. Viscosity of lubricants under these conditions is directly related to engine cranking and startability. Oils treated with dispersant additives according to the present invention pass the CCS specification.

Passenger car motor oils (PCMO) typically are required to aid in a vehicle's sludge control. The Sequence VG test corresponds to ASTM D6593-04—"Standard Test Method for Evaluation of Automotive Engine Oils for Inhibition of Deposit Formation in a Spark-Ignition Internal Combustion Engine Fueled with Gasoline and Operated Under Low-Temperature, Light-Duty Conditions." The Sequence VG test method has been correlated with vehicles used in stop-and-go service prior to 1996, particularly with regard to sludge and varnish formation. It is one of the test methods required to evaluate oils intended to satisfy the API SL performance category. The Sequence VG test evaluates a lubricant's ability to prevent sludge and varnish formation. The Sequence VG test is a replacement test for Sequence VE, ASTM D 5302, sludge and varnish. Moderate temperature taxicab service, urban and suburban delivery service, or job commuting service is simulated. The Sequence VG lubricant test is an engine dynamometer test that duplicates the Sequence VE application, except that wear is not evaluated.

Advantageous results are also achieved by employing the additive mixtures of the present invention in base oils conventionally employed in and/or adapted for use as crankcase oils, power transmitting fluids, heavy duty hydraulic fluids, power steering fluids and the like. Gear lubricants, industrial oils, pump oils and other lubricating oil compositions can also benefit from the incorporation therein of the additive mixtures of the present invention.

The finished lubricating oil composition may include other additives in addition to the copolymer of the present invention. For instance, these lubricating oil formulations may contain additional additives that will supply the characteristics that are required in the formulations. Among these types of additives are included additional dispersants, viscosity index improvers, antioxidants, corrosion inhibitors, detergents, pour point depressants, antiwear agents, antifoaming agents, demulsifiers, extreme pressure agents, and friction modifiers.

In the preparation of lubricating oil formulations it is common practice to introduce the additives in the form of 10 to 80 wt. % active ingredient concentrates in hydrocarbon oil, e.g. mineral lubricating oil, or other suitable solvent.

Usually these concentrates may be diluted with 3 to 100, e.g., 5 to 40, parts by weight of lubricating oil per part by weight of the additive package in forming finished lubricants, e.g. crankcase motor oils. The purpose of concentrates, of course, is to make the handling of the various materials less difficult and awkward as well as to facilitate solution or dispersion in the final blend. Thus, the total amount of base polymer and/or multi-functional polyalkylacrylate copolymer would usually be employed in the form of a 10 to 50 wt. % concentrate, for example, in a lubricating oil fraction. In one embodiment, the total amount of the base polymer and/or multi-functional polyalkylacrylate copolymer dispersant in finished lubricating oil is from about 0.1 weight percent to about 20 weight percent, particularly about 1 weight percent to about 5.0 weight percent, and more particularly about 0.5 weight percent to about 2.5 weight percent.

The base polymer and/or multi-functional polyalkylacrylate copolymers of the present invention will generally be used in admixture with a lube oil base stock, comprising an oil of lubricating viscosity, including natural lubricating oils, synthetic lubricating oils and mixtures thereof. Natural oils include animal oils and vegetable oils (e.g., castor, lard oil), liquid petroleum oils and hydrorefined, solvent-treated or acid-treated mineral lubricating oils of the paraffinic, naphthenic and mixed paraffinic-naphthenic types. Oils of lubricating viscosity derived from coal or shale are also useful base oils. The synthetic lubricating oils used in this invention include one of any number of commonly used synthetic hydrocarbon oils, which include, but are not limited to, poly-alpha-olefins, alkylated aromatics, alkylene oxide polymers, copolymers, terpolymer, interpolymers and derivatives thereof here the terminal hydroxyl groups have been modified by esterification, esterification etc, esters of dicarboxylic acids and silicon-based oils.

The present invention is further directed to a method of extending lubricant drain intervals in a vehicle is contemplated. Said method comprises adding to and operating in the crankcase of the vehicle the lubricating oil composition described above.

The following examples illustrate the preparation and use of novel polymers of the present invention. All amounts, percentages, parts, and ratios are by weight unless indicated otherwise.

EXAMPLES

Dispersant additives representing non-limiting embodiments of the present invention were prepared and tested for performance.

Example 1

Base Polymer Preparation. Acylated alkyl methacrylate copolymers, as base polymers ("BP1"-"BP7"), were initially prepared in the following manner. Butyl methacrylate ("BMA", MW=142.2), lauryl methacrylate ("LMA", MW=262.2), and cetyl methacrylate ("CMA", MW=327.6), were combined maleic anhydride ("MA", MW=98.06), lauryl mercaptan ("LSH"), and azoisobutyronitrile (AIBN) in a two liter reaction vessel equipped with nitrogen atmosphere and two mixing impellers rotated at 300 rpm during the reaction. The reaction was allowed to proceed for about 4 hours at about 79-85° C. followed by 1 hour at 100° C. Unreacted maleic anhydride and free radical initiator were removed by heating the reaction mass to 120° C., and applying a vacuum. Reactant amounts and the properties of several representative copolymer products thus obtained are indicated in Table 1.

TABLE 1

| Base Polymer Sample | % AIBN | % LSH | % MA | % BMA | % LMA | % CMA | $M_w$ | $M_n$ |
|---|---|---|---|---|---|---|---|---|
| BP1 | 0.25 | 2.5 | 5.00 | 11.0 | 57.0 | 0.3 | 12019 | 7615 |
| BP2 | 0.09 | 0.44 | 1.00 | 12.0 | 60.0 | 0.3 | 31510 | NA |
| BP3 | 0.24 | 2.45 | 7.50 | 11.0 | 57.0 | 0.3 | 13588 | 8442 |
| BP4 | 0.09 | 0.44 | 1.00 | 12.0 | 60.0 | 0.3 | 53439 | 32068 |
| BP5 | 0.24 | 2.45 | 5.00 | 10.56 | 54.74 | 3.0 | 12861 | 8189 |
| BP6 | 0.25 | 2.5 | 5.00 | 11.0 | 57.0 | 0.3 | 12611 | 8625 |
| BP7 | 0.24 | 1.40 | 5.00 | 11.0 | 57.0 | 0.3 | 20585 | 13040 |

Functionalization (Amination) Reaction.

Some of the base polymers amongst BP1-BP7 thus obtained were then separately further reacted with a hydrocarbyl amine compound to form Sample Dispersants 1-7 in the manners described below. The processes used to make several succinimide reactants used in the dispersant product preparations are also described below. Several physical properties of the synthesized functionalized products were measured, and the results are reported in Table 2 below.

Preparation of Succinimide Reactants:

Succinimide A (PIBSI):

A 3 L resin kettle equipped with overhead stirrer, Dean Stark trap, and a thermocouple was charged with 960 g of PIBSA (TAN 0.552) and heated with stirring under nitrogen to 180° C. 100.2 g of TEPA was added dropwise over 30 minutes. The reaction mixture was heated at 180° C. under vacuum for 3 hr. The reaction mixture was diluted with 382 g of process oil and filtered to afford 1321.2 g of desired product.

Succinimide B (PIBSI):

A 2 L resin kettle equipped with overhead stirrer, Dean Stark trap, and a thermocouple was charged with 587.6 g of PIBSA (TAN of 0.902) and heated with stirring under nitrogen to 155° C. 100.2 g of TEPA was added dropwise over 30 minutes. The reaction mixture was heated at 155° C. under vacuum for 3 hr. and transferred into a container.

Sample 1 Dispersant:

A 1000 mL resin kettle equipped with overhead stirrer, Dean Stark trap, and a thermocouple was charged with 92 g of the acylated alkyl methacrylate copolymer of BP1, 216.6 g of process oil and 58.2 g of a succinimide B. The reaction mixture was heated at 130° C. for 3 hr. under nitrogen. The reaction mixture was stirred and heated under nitrogen for 3 hr. and for an additional 2 hr. under vacuum. The reaction mixture was transferred to a jar to afford 309 g of product.

Sample 2 Dispersant:

A 1000 mL resin kettle equipped with overhead stirrer, Dean Stark trap, and a thermocouple was charged with 92 g of the acylated alkyl methacrylate copolymer of BP 6, 216.6 g of process oil and 58.2 g of a succinimide B. The reaction mixture was heated at 130° C. for 3 hr. under nitrogen. The reaction mixture was stirred and heated under nitrogen for 3 hr. and for an additional 2 hr. under vacuum. The reaction mixture was transferred to a jar to afford 301.3 g of product.

Sample 3 Dispersant:

A 1000 mL resin kettle equipped with overhead stirrer, Dean Stark trap, and a thermocouple was charged with 100 g of the acylated alkyl methacrylate copolymer of BP3, 422.9 g of process oil and 89 g of a succinimide B. The reaction mixture was heated at 130° C. for 3 hr. under nitrogen). The reaction mixture was stirred and heated under nitrogen for 3 hr. and for an additional 2 hr. under vacuum. The reaction mixture was transferred to a jar to afford 574.2 g of product.

Sample 4 Dispersant:

A 1000 mL resin kettle equipped with overhead stirrer, Dean Stark trap, and a thermocouple was charged with 92 g of the acylated alkyl methacrylate copolymer of BP6 204.2 g of process oil and 135.2 g of a succinimide 1. The reaction mixture was heated at 130 C for 3 hr. under nitrogen.). The reaction mixture was stirred and heated under nitrogen for 3 h and for an additional 2 h under vacuum. The reaction mixture was transferred to a jar to afford 403.6 g of product.

Sample 5 Dispersant:

A 1000 mL resin kettle equipped with overhead stirrer, Dean Stark trap, and a thermocouple was charged with 100 g of the acylated alkyl methacrylate copolymer of BP5, 359.7 g of process oil and 59.3 g of a succinimide B. The reaction mixture was heated at 130° C. for 3 hr. under nitrogen.). The reaction mixture was stirred and heated under nitrogen for 3 hr. and for an additional 2 hr. under vacuum. The reaction mixture was transferred to a jar to afford 456.2 g of product.

Sample 6 Dispersant:

A 1000 mL resin kettle equipped with overhead stirrer, Dean Stark trap, and a thermocouple was charged with 59.3 g of succinimide B and heated with stirring under nitrogen to 130° C. To this stirred mixture was added 718.8 g of the diluted acylated alkyl methacrylate copolymer of BP7 (diluted with process oil to prepare a 20% active solution). The reaction mixture was stirred and heated under nitrogen for 3 hr. and for an additional 2 hr. under vacuum. The reaction mixture was transferred to a jar to afford 750.5 g of product.

Sample 7 Dispersant:

A 3 L resin kettle equipped with overhead stirrer, Dean Stark trap, and a thermocouple was charged with 845.7 g of PIBSA (TAN 0.946), 40 g of the acylated alkyl methacrylate copolymer of BP1 and 1134.5 g process oil. This mixture was stirred and heated to 130° C. under nitrogen. To this mixture was added 52.8 g of TEPA via an addition funnel. The reaction mixture was stirred and heated under nitrogen for 3 hr. and for an additional 2 hr. under vacuum. The reaction mixture was filtered into a jar and afforded 1992 g of product.

Sample 8 Dispersant:

A 3 L resin kettle equipped with overhead stirrer, Dean Stark trap, and a thermocouple was charged with 845.7 g of PIBSA (TAN 0.946), 85 g of the acylated alkyl methacrylate copolymer of BP1 and 1202 g process oil. This mixture was stirred and heated to 130° C. under nitrogen. To this mixture was added 52.8 g of TEPA via an addition funnel. The reaction mixture was stirred and heated under nitrogen for 3 hr. and for an additional 2 hr. under vacuum.

Sample 9 Dispersant:

A 1000 mL resin kettle equipped with overhead stirrer, Dean Stark trap, and a thermocouple was charged with 588.8 g of the diluted acylated alkyl methacrylate copolymer of BP3 (diluted with process oil to prepare a 40% active solution) and heated with stirring under nitrogen to 130° C. To this stirred mixture was added 78 g of alkyl ether diamine (available as TOMAH® DA-17 from Tomah). The reaction mixture was stirred and heated under nitrogen for 3 hr. and for an additional 2 hr. under vacuum. The reaction mixture was transferred to a jar to afford 652.8 g of product.

Sample 10 Dispersant:

A 500 mL resin kettle equipped with overhead stirrer, Dean Stark trap, and a thermocouple was charged with 100 g of the acylated alkyl methacrylate copolymer BP3 and 322.5 g of process oil. This mixture was heated with stirring under nitrogen to 150° C. To this stirred mixture was added 6.9 g of 1,4-bis (3-aminopropyl)piperazine. The reaction mixture was stirred and heated under nitrogen for 4 h and for an additional 1 h under vacuum. The reaction mixture was transferred to a jar to afford 419.4 g of product.

TABLE 2

| Dispersant | Activity | N (%) | TBN | KV@100 |
|---|---|---|---|---|
| Sample 2 | 0.40 | 0.93 | 17.2 | 145.9 |
| Sample 4 | 0.40 | 0.69 | 13.1 | 177.5 |
| Sample 3 | 0.30 | 0.83 | 15.3 | 137.2 |
| Sample 5 | 0.30 | 0.64 | 12.1 | 56.5 |
| Sample 6 | 0.20 | 0.412 | 8.0 | 51.2 |
| Sample 8 | 0.40 | 0.91 | 14.8 | 122.7 |
| Sample 7 | 0.40 | 0.94 | 15.0 | 116.1 |
| Sample 9 | 0.40 | | 24.4 | 50.6 |
| Sample 10 | 0.20 | 0.49 | 9.6 | |

Example 2

Several additional representative dispersant compounds of the invention, labeled as Samples 1*, 3*, 5*, 6* and 8* herein, were prepared using the basic reaction processing described above for Samples 1, 3, 5, 6, and 8, respectively, which were evaluated for their blend properties in a GF-45 W30 PCMO formulation in performance tests including kinematic viscosity tests (KV100) and CCS tests. The results are reported in Table 3. The representative dispersant compounds were blended at equal polymer content. The fully formulated oils contained H5751 a commercial VI improver available from Afton Corporation. Comparative Sample 1 utilized a mixture of commercial dispersants.

TABLE 3

| Dispersant | KV100 | CCS (−30 C.) | VI Improver wt. % |
|---|---|---|---|
| Comp. Sample 1 | 10.98 | 6128 | 8.70 |
| Sample 1* | 11.03 | 5236 | 9.20 |
| Sample 3* | 11.16 | 5468 | 6.50 |
| Sample 5* | 10.93 | 5361 | 8.30 |
| Sample 6* | 11.10 | 5570 | 6.30 |
| Sample 8* | 10.87 | 5388 | 8.70 |

A portion of dispersant Sample 6* also was prepared for Sequence VG engine testing, and blended into a SAE 5W30 lubricating oil. The sludge containing properties of this dispersant and a commercially available dispersant, were compared in an industry dispersant sludge test, i.e., Sequence VG engine test, to determine the average engine sludge (AES). The results are reported in Table 4 below. The Sequence VG engine sludge and varnish deposit test is a fired engine-dynamometer test that evaluates the ability of a lubricant to minimize the formation of sludge and varnish deposits. The test is a replacement for the Sequence VE test (ASTM D 5302). The test method was a cyclic test, with a total running duration of 216 hours, consisting of 54 cycles of 4 hours each. The test engine was a Ford 4.6L, spark ignition, four stroke, eight cylinder "V" configuration engine. Features of this engine include dual overhead camshafts, a cross-flow fast burn cylinder head design, two valves per cylinder, and electronic port fuel injection. A 90-minute break-in schedule was conducted prior to each test, since a new engine build is used for each test. Upon test completion, the engine was disassembled and rated for sludge. Average engine sludge was calculated for each sample. The modified dispersant was the same as described above and the conventional dispersant was a bis-succinimide as described above.

TABLE 4

| Dispersant | Average Engine Sludge Rating (AES) |
|---|---|
| Sample 6* | 8.24 |
| HiTEC ® 1932 dispersant | 8.07 |

As will be understood, the higher the AES rating the better the sludge handling capability of the lubricant. A rating above 7.8 is a pass rating for the Sequence VG engine test.

While the invention has been particularly described with specific reference to particular process and product embodiments, it will be appreciated that various alterations, modifications and adaptations may be based on the present disclosure, and are intended to be within the spirit and scope of the present invention as defined by the following claims.

What is claimed is:

1. A dispersant additive comprising a reaction product obtained by
reacting i) a first set of monomers comprising alkylacrylates comprising three different subgroups including a first subgroup of alkyl acrylates wherein the alkyl group has 1 to 4 carbon atoms, a second subgroup thereof wherein the alkyl group has 8 to 16 carbon atoms, and a third subgroup wherein the alkyl group has 17 to 30 carbon atoms, with ii) a second monomer comprising an unsaturated anhydride acylating agent under conditions effective for free radical polymerization of the first and second monomers to provide a base polymer comprising an acylated alkylacrylate copolymer having a weight average molecular weight between about 5,000 and about 50,000, and
after formation of the acylated alkylacrylate copolymer base polymer, reacting the base polymer with hydrocarbyl amine to form an amine-functionalized polyalkylacrylate copolymer dispersant, wherein the hydrocarbyl amine further comprises an acylated mono polyisobutylene succinimide group.

2. The dispersant additive of claim 1, wherein the base polymer has a number average molecular weight between about 8,000 to about 15,000.

3. The dispersant additive of claim 1, further comprising a second hydrocarbyl amine is selected from the group consisting of polyalkylene succinimide, acylated polyalkylene succinimide, alkyl polyamines, fatty polyamines, and fatty alkyl ether polyamines.

4. The dispersant additive of claim 1, further comprising a second hydrocarbyl amine is an alkyl polyamine selected from the group consisting of diethylenetriamine (DETA), triethylenetetramine (TETA), tetraethylenepentamine (TEPA), pentaethylenehexamine (PEHA), and bis-aminopropyl piperazine.

5. The dispersant additive of claim 1, wherein the mono succinimide is represented by the formula:

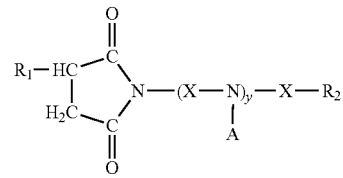

in which $R_1$ is a hydrocarbyl radical having from about 8 to 800 carbon atoms, X is a divalent alkylene or secondary hydroxy substituted alkylene radical having from 2 to 3 carbon atoms, A is a hydrogen or a hydroxyacyl radical selected from the group consisting of glycol, lactyl, 2-hydroxy-methyl propionyl and 2,2'-bishydroxymethyl propionyl radicals and in which at least 30 percent of said radicals represented by A are said hydroxyacyl radicals, y is a number from 1 to 6, and $R_2$ is a radical selected from the group consisting of —$NH_2$, —NHA or a hydrocarbyl substituted succinyl radical having the formula

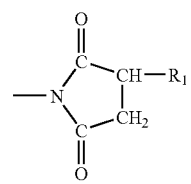

in which $R_1$ is as defined above.

6. The dispersant additive of claim 1, wherein the gravimetric ratio of the first, second and third subgroups of alkylacrylate monomers ranges from about 5:95:0.05 to about 35:55:10, respectively.

7. The dispersant additive of claim 1, wherein the alkylacrylates have the general structure:

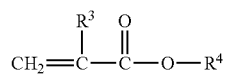

where $R^3$ is hydrogen or a C1-C5 alkyl group, and $R^4$ is a non-substituted or substituted C1-C30 alkyl group with the proviso that $R^4$ is selected effective to provide said first, second and third subgroups of alkylacrylate monomers in said molar ratio.

8. The dispersant additive of claim 7, wherein $R^3$ is methyl.

9. The dispersant additive of claim 1, wherein the second monomer comprises an unsaturated dicarboxylic acid anhydride or corresponding acid thereof.

10. The dispersant additive of claim 1, wherein the second monomer is selected from the group consisting of maleic anhydride, itaconic anhydride, halomaleic anhydride, alkylmaleic anhydride, maleic acid, fumaric acid, and combinations and derivatives thereof.

11. The dispersant additive of claim 1, wherein the first monomer comprises methacrylate and the second monomer comprises maleic anhydride.

12. The dispersant additive of claim 1, wherein the base polymer comprises monomeric units derived from about 99.9 to about 80 weight percent of said first set of alkylacrylate monomers and about 0.1 to about 20 weight percent unsaturated anhydride acylating agent monomers.

13. The dispersant additive of claim 1, wherein the additive reaction product comprises a multi-functional polymer viscosity modifier having a number average molecular weight between about 5,000 to about 50,000.

14. An additive concentrate comprising, on an active ingredient basis, 20 to 90 weight percent of a carrier or diluent oil and from about 10 to about 80 weight percent of the additive reaction product of claim 1.

15. A lubricating oil composition comprising a major amount of an oil of lubricating viscosity and a minor amount of the additive reaction product of claim 1.

16. The lubricating oil composition of claim 15, wherein the additive reaction product is present in the lubricating oil composition in amount of from about 0.5 weight percent to about 18 weight percent.

17. The lubricating oil composition of claim 15, wherein the oil of lubricating viscosity is selected from the group consisting of Group I oils, Group II oils, Group III oils, Group IV oils, synthetic oils, and mixtures thereof.

18. The dispersant additive of claim 1, wherein the first monomer comprises methacrylate and the second monomer comprises maleic anhydride.

* * * * *